US009884459B2

(12) United States Patent
Hubauer

(10) Patent No.: US 9,884,459 B2
(45) Date of Patent: Feb. 6, 2018

(54) METHOD AND DEVICE FOR PRODUCING A MOLD

(71) Applicant: Lisa Dräxlmaier GmbH, Vilsbiburg (DE)

(72) Inventor: Franz Hubauer, Schalkham (DE)

(73) Assignee: LISA DRAEXLMAIER GMBH, Vilsbiburg (DE)

( * ) Notice: Subject to any disclaimer, the term of this patent is extended or adjusted under 35 U.S.C. 154(b) by 420 days.

(21) Appl. No.: 14/510,505

(22) Filed: Oct. 9, 2014

(65) Prior Publication Data
US 2015/0102524 A1    Apr. 16, 2015

(30) Foreign Application Priority Data
Oct. 10, 2013   (DE) .................. 10 2013 016 858

(51) Int. Cl.
*B29C 70/48*      (2006.01)
*B29C 45/16*      (2006.01)
(Continued)

(52) U.S. Cl.
CPC ........ *B29C 70/48* (2013.01); *B29C 45/14786* (2013.01); *B29C 45/1671* (2013.01); *B29C 45/0441* (2013.01); *B29C 45/1418* (2013.01); *B29C 2045/0093* (2013.01); *B29C 2793/00* (2013.01); *B29K 2101/12* (2013.01); *B29K 2105/0038* (2013.01); *B29K 2105/0058* (2013.01); *B29K 2105/08* (2013.01); *B29L 2009/00* (2013.01); *B29L 2031/7739* (2013.01)

(58) Field of Classification Search
CPC ...... B29C 70/48; B29C 70/68; B29C 45/1671
See application file for complete search history.

(56) References Cited

U.S. PATENT DOCUMENTS

| 4,493,918 A | * | 1/1985 | Meyer ............... C08L 23/02 524/443 |
| 5,506,029 A | * | 4/1996 | Hara ............... B29C 45/14786 428/120 |

(Continued)

FOREIGN PATENT DOCUMENTS

| DE | 69222130 T2 | 1/1998 |
| DE | 102004054228 A1 * | 6/2006 ............ B29C 45/14 264/257 |

(Continued)

OTHER PUBLICATIONS

English Translation of DE 102004054228, Retrieved May 14, 2017.*

*Primary Examiner* — Matthew Daniels
(74) *Attorney, Agent, or Firm* — Finnegan, Henderson, Farabow, Garrett & Dunner LLP

(57) ABSTRACT

A device for producing a mold part. The device includes a first tool component and a second tool component. The first tool component has a first pressing surface and a first cavity. The second tool component has second pressing surface, a second cavity, and a nozzle configured to supply a liquefied synthetic material. The first and second cavities are configured to overlap at least partially in a cross-section perpendicular to the first and second pressing surfaces when the first and second pressing surface face each other. At least one of the first and second tool components is configured to be movable relative to another.

12 Claims, 3 Drawing Sheets

(51) Int. Cl.
*B29C 45/14* (2006.01)
*B29K 101/12* (2006.01)
*B29K 105/00* (2006.01)
*B29K 105/08* (2006.01)
*B29L 9/00* (2006.01)
*B29L 31/00* (2006.01)
*B29C 45/04* (2006.01)
*B29C 45/00* (2006.01)

(56) References Cited

U.S. PATENT DOCUMENTS 9,321,202 B2 * 4/2016 Hubauer ............. B29C 45/1418
2008/0292858 A1 * 11/2008 Dajek ............... B29C 45/14631
428/220

FOREIGN PATENT DOCUMENTS

| DE | 102004054228 A1 | 6/2006 | |
| DE | 202007007498 U1 | 7/2008 | |
| DE | 102011005350 A1 | 9/2012 | |
| WO | WO 2007/098869 A1 | 9/2007 | |
| WO | WO 2012120146 A1 * | 9/2012 | ......... B29C 45/1418 |

* cited by examiner

METHOD AND DEVICE FOR PRODUCING A MOLD

CROSS-REFERENCE TO RELATED APPLICATIONS

This application is based upon and claims the benefit of prior German Application No. 10 2013 016 858.9, filed on Oct. 10, 2013, the entire contents of which are incorporated herein by reference.

TECHNICAL FIELD

The disclosure relates to a device and a method for the production of a mold with a fiber-reinforced support and connected therewith at least one add-on piece featuring synthetic material, with the mold being suitable in particular for use as a decorative part or further processing in the interior of motor vehicles.

BACKGROUND OF THE DISCLOSURE

Until now, supports for decorative parts, such as for interior door panels, center door panels, center consoles, instrument panels and the like were produced in injection molding processes or by means of pressing thermal or duroplastic natural fiber mat systems. The connection between the function elements such as stiffening ribs, fastening means, and the like is normally achieved by gluing on or welding on the synthetic parts. These supports are then laminated with decorations. Another production method is the direct in-mold decorating.

If molded support parts are used, the process steps of molding the support mat and injecting the function elements and connecting the function elements to the molded support are generally performed in different process steps and with different tools.

DE 10 2004 054 228 A1 describes a method and a device for the production of a mold, with a natural fiber blank being heated in a first step, and then a mold being produced from the blank by pressing two form elements together. Thereafter, a function part is molded onto the mold by injecting a synthetic material melt, with a cavity being created at the mold prior to injecting the synthetic material melt. These steps are performed in one device. A similar method and a similar device are described in DE 692 22 130 T2.

In both cases, the function elements or synthetic material parts are injection-molded to the natural fiber mat. An improved integration between the pressed mat and the function parts requires additional process steps and additional devices.

An improvement of the integration between natural fiber mat and function elements is described in DE 10 2011 005 350 A1. The device in DE 10 2011 005 350 A1 has two tool components that are movable relative to one another. When the tool components are in an opened state, a fiber-reinforced mat can be inserted, which is molded and strengthened by means of pressure during closing. A nozzle is provided in one of the two tool components, through which liquid synthetic material is pressed onto the inserted mat in such a fashion that the synthetic material melt penetrates the inserted mat and reaches a cavity on the opposite side, which is developed in the other tool component.

What is problematic is attaching function elements on the nozzle side of the fiber-reinforced mat and on both sides of the mat. In addition, there is a general desire for an even better and more durable connection between the add-on elements and the mat.

SUMMARY

One object of the disclosed embodiments is to improve the integration between a pressed, fiber-reinforced support and add-on pieces featuring synthetic material for the production of a mold, in particular facilitating a two-sided development of one or more add-on pieces under optimized production processes.

The object is achieved with a device (also referred to as a "tool") having the characteristics consistent with embodiments of the disclosure.

The tool according to the disclosure combines the properties of a pressing tool and an injection-molding tool. The production of a support for a decorative part, for example a support for the interior door panel with a thermal- or duroplastic fiber-reinforced mat as base support, and add-on pieces provided at both sides, such as function elements, stiffening elements, etc., is performed in one facility.

According to the disclosure, the device for the production of a mold having a fiber-reinforced support and at least two add-on pieces featuring synthetic material connected therewith has at least two tool components. At least one tool component is movable relative to the other. Both tool components have a respective pressing surface, between which a fiber-reinforced mat can be inserted. When the device is in an opened state, a fiber-reinforced mat can be inserted. The tool components are provided as mold halves and, when closed, provide the mat with a three-dimensional contour, molding and strengthening the mat by means of pressure. In one of the two tool components, referred to here as a second tool component, at least one nozzle is provided, through which liquid synthetic material can be pressed into the inserted mat in such a fashion that the pressurized melt, which may be hot, penetrates the molded or not-yet-molded mat and reaches at least one cavity away from the nozzle on the opposite side. The at least one cavity away from the nozzle is provided in the other tool component, referred to here as a first tool component. Furthermore, at least one cavity at the nozzle is provided in the second tool component, which at least partially overlaps with the cavity away from the nozzle in a cross section perpendicular to the inserted mat and therefore forms an overlapping area.

After the cavity away from the nozzle has been filled with the liquefied synthetic material and melt continues to be injected, the injected melt penetrates the mat in the overlapping area of both cavities and back up, filling the cavity at the nozzle. A special nozzle is not required for filling the cavity at the nozzle in the first tool component. Furthermore, it is possible to first fill the cavity at the nozzle with the synthetic material melt. After the cavity at the nozzle is filled, the synthetic material melt penetrates the mat in the overlapping area and fill the cavity away from the nozzle. In some embodiments, the first tool component does not have a nozzle, as long as there is at least one cavity at the nozzle and one cavity away from the nozzle, which can both be filled with synthetic material by one nozzle. The mat does not necessarily have to be attenuated separately because this is done automatically by the pressurized melt. The cavity at the nozzle and the cavity away from the nozzle correspond to the form of one or a plurality of add-on pieces, such as function elements. Examples of the function elements may include a stiffening rib or a fastening part. The melt quantity and the pressure can be controlled by means of a controllable nozzle. Compared to a method of molding the support and later on attaching function elements, the number of tools and production facilities, and therefore the production costs are reduced. Compared to an injection-molded support with function elements, the weight is reduced.

The synthetic material structure, which is formed by the respective cavity, can be an add-on piece or a plurality of add-on pieces, which may be determined by the intended functionality of the synthetic part(s). The synthetic material melt can be injected through the molded, partially molded, or unmolded mat.

The fastening and/or integration of the add-on piece and the support are clearly improved because the injected synthetic material forms a bond with the polymer of the mat, which may be heated. Furthermore, a mechanical connection, such as a mechanical clawing, is created along the entire thickness of the injected area of the mat, which also improves the integration. There will be no shoulders, bumps or the like on the surface of the decorative side. By specifically injecting the synthetic material through the fiber mat, the fiber mat still has vacuum in the surrounding areas for a potential subsequent laminating process.

According to the invention, only one feed orifice is needed to fill the cavity away from the nozzle and the cavity at the nozzle. This allows for additional design freedom of the add-on pieces at little additional production effort and little modification of the device. Additionally, the mat does not have to be opened/cleared first at the transition between the two cavities in a separate process step because this is done automatically by the pressurized melt during the injection molding process. An additional advantage is the improved adhesion of the add-on elements because they are directly connected to one another.

In some embodiments, the cavity that is arranged in the direction of flow of the liquefied synthetic material after the overlapping area has a greater dimension in directions perpendicular to the pressing surface than at least one dimension in a direction parallel to the pressing surface in the same area. Because the synthetic material is introduced into the cavities under a high pressure, at least part of the mat may be pressed into the cavity. Especially in the overlapping area, the liquefied synthetic material introduced under high pressure may not penetrate the mat but rather press the mat as such into the cavity. This may limit a filling of the cavities with the synthetic material. Because the dimensions of the cavity that is arranged in the direction of flow of the liquefied synthetic material after the overlapping area has a greater dimension in the direction perpendicular to the pressing surface than at least one dimension in the directions parallel to the pressing surface, only a part of the fiber material may penetrate the cavity due to the inherent stiffness of the mat, and hence the risk of pressing the mat into a cavity is reduced. At the same time, the special design ensures that the liquefied synthetic material can build up sufficient pressure on the mat in the overlapping area so that the synthetic material can simply penetrate the mat.

In some embodiments, the cavity that is arranged in the direction of flow of the liquefied synthetic material after the overlapping area has a dimension of at least about 5 millimeters in the direction perpendicular to the pressing surface in the penetration area, and a dimension of about 2 to about 3 millimeters in the direction parallel to the pressing surface.

In some embodiments, the pressing surface of the first and/or the second tool component has bumps in a peripheral area of the cavities. The bumps penetrate the mat during the pressing process so that the fiber mat is molded stronger in these areas and therefore compressed more than in the surrounding areas. Because of the enhanced compressing, the fiber mat is less penetrable for the synthetic material being introduced into the cavities. This ensures that the synthetic material penetrates into the cavities only at the intended places and that there is no over-injection into the fiber mat. In some embodiments, the bumps are provided as webs or lips, which run perpendicularly away from the pressing surface. In some embodiments, the bumps have a height of about 5 to about 10 mm.

To remove the produced fiber-reinforced support part from the device, the first tool component has an ejector. The ejector can be provided as a retractable cylinder, for example. Because only the second tool component has a nozzle, the production effort for the tool components is significantly less than for conventional tool components because the nozzle and the ejector are split between the two tool components and therefore the complexity of the individual tool components can be reduced.

In some embodiments, the fiber-reinforced support has a thickness of about 1 to about 3 millimeters, such as about 1.5 to about 2 millimeters. Therefore, a support can be provided which has sufficient inherent stiffness as well as a low dead weight. Furthermore, it is ensured that the liquid synthetic material sufficiently penetrates the fiber-reinforced support and that at the same time the support represents a stable base for the add-on pieces to be generated.

In some embodiments, the nozzle is arranged in the second tool component in the cavity at the nozzle so that the liquefied synthetic material, when it leaves the nozzle, immediately penetrates into the cavity at the nozzle, and penetrates the mat only after the cavity at the nozzle has been filled. Because the cavity at the nozzle is filled directly by the nozzle, the synthetic material has to penetrate the mat only once to fill both cavities. Therefore, the liquefied synthetic material can be introduced into the cavities with less pressure, which further reduces the risk of over-injecting the liquefied synthetic material into the mat.

Alternately, the nozzle in the second tool component can also be arranged outside of the cavity at the nozzle. In that case, the liquefied synthetic material, after it leaves the nozzle, is first conveyed through the mat into the cavity away from the nozzle. After the cavity away from the nozzle is filled, the liquefied synthetic material penetrates the mat a second time in the overlapping area of the cavity away from the nozzle and the cavity at the nozzle, and fills the cavity at the nozzle. Because residual synthetic material remains within the mat as the synthetic material penetrates the mat to fill the cavities, repeated penetration of the liquefied synthetic material through the mat can create add-on pieces after solidification which have an especially firm connection to the fiber-reinforced support without having to use adhesives or other bonding agents for this purpose.

In some embodiments, the mat is preheated, for example to a temperature between about 100° C. and about 300° C., such as between about 180° C. and about 220° C., either outside of the tool or in the tool by means of an integrated heating device. This simplifies the forming of a three-dimensional contour and, if applicable, the bonding with the synthetic material to be injected. The heated mat is positioned between the open tool components and fixed in position, if applicable. Fixation can be achieved by means of a frame, clamps, or pins, etc.

In some embodiments, the device has at least one cutting edge where a contour cut or the cutting of a breakthrough is performed. The cutting edge can be provided so that there is a cut at the cutting edge, for example, immediately when the tool components are pressed together. Alternatively, the cutting edge can be designed such that the fiber mat is pressed with a cutting contour at the cutting edge for a subsequent cutting of the support.

In some embodiments, the at least one nozzle is a hot nozzle with needle shutoff, through which the synthetic material is pressed onto the mat by means of pressure. With needle shutoffs, the nozzle opening is closed after the injection by means of a needle. For example, the needle can be designed with a sharp tip, conically or cylindrically. The injection residue is pressed into the synthetic material part so that the needle system provides the surface of the add-on piece with a clean "seal" and a spotless geometry. Furthermore, one or a plurality of controllable needle shutoffs can control the melt quantity and the melt pressure.

In some embodiments, the needle of the nozzle penetrates the mat, which facilitates the injection.

In some embodiments, the first tool component, i.e., the tool component having the cavity on the side away from the nozzle, is movable whereas the second tool component, i.e., the tool component having the nozzle, is stationary. Providing and supplying the synthetic material can be managed in a simple manner by the stationary tool component.

In some embodiments, the second and/or first tool component is provided with a plurality, for example two or four, pressing surfaces on different sides. In this way, different pressing patterns can be realized in a module-like fashion. Furthermore, the additional pressing surfaces can interact with the corresponding pressing surfaces of additional tool components so that several mats can be worked on at the same time. To that end, one of the tool components, which is also referred to as a center tool component here, can be designed as a mobile turning unit so that the inserting of the fiber-reinforced mats and the removal of the injected mats is realized by rotating the center tool components.

In some embodiments, the center tool component interacts with two other tool components, for example at the same time, in such a fashion that two mats can be molded simultaneously and provided with add-on pieces, as long as there is at least one cavity at the nozzle and one cavity away from the nozzle, both of which are filled with synthetic material from only one nozzle.

The center tool component can be provided in a stationary and/or movable fashion. The two other tool components are designed such, for example, that both are movable, or one of the two tool components is stationary and the other of the two tool components is movable.

As already indicated, the center tool component may be designed as a mobile turning unit. The turning unit can be rotated relative to the two other tool components.

If a center tool component is provided, a single-step or a two-step process can be realized with the device:

In the single-step process, molds are provided at both sides of the center tool component, for example at the same time, according to the aforementioned process. This means that the output of the device is doubled. In that case, the center tool component can be developed as a stationary and/or movable tool component, as well as in form of a turning unit, for example to simplify the insertion of one or both mats to be molded in the one tool.

In the two-step process, the injection of the mat and the integration of a first add-on piece or a first group of add-on pieces occur at one side of the device. To that end, the tool is closed and the process is performed similarly to the description above. Then the tool is opened and the turning unit with the intermediate product attached to it is rotated so that the intermediate product is delivered to a third tool component. The tool is closed again to apply a decorative layer and/or to inject behind the mold and/or to integrate an additional group of add-on pieces with the mat in an injection molding process. By delivering the mats to the device in such a fashion that both mold cavities are provided with mats in each closing process, an extension of the production cycle can be avoided despite the two-step process.

Together, the three tool components constitute two units for molding the mats and integrating add-on pieces. In some embodiments, at least the center tool component and one of the two tool components are provided in a movable fashion, with the two outer tool components, and therefore also the outer movable tool component, each having a nozzle. In some embodiments, the center tool component has on both sides at least one respective cavity away from the nozzle and no nozzle, with the other tool components having at least one nozzle and a cavity at the nozzle.

In some embodiments, the molding of the synthetic material, e.g., the production of the add-on pieces, is performed immediately after the closing of the tool and the injection of the mat are completed. In this way, it can be ensured that the degree of hardening of the fiber mat is still optimally low so that it may be guaranteed that the synthetic material can penetrate the fiber mat. To that end, the fiber mat has a thermoplastic matrix, in particular made of synthetic material. The matrix can include PP, ABS, PC/ABS, or PA, and can have filler- and/or reinforcement materials. Furthermore, the fiber mat is sufficiently heated prior to the pressing process so that the melting temperature of the thermoplastic matrix is exceeded and it melts open. The thermoplastic matrix guarantees that the fiber-reinforced support part generated from the fiber mat retains its form even after the pressing process and simultaneously allows an injection through the mat during the pressing process.

In some embodiments, the synthetic material is introduced into the cavities while the thermoplastic matrix is melted open.

Therefore, this facilitates a penetration of the synthetic material through the fiber mat even further and no over-injections would be created. In some embodiments, the thermoplastic matrix of the mat and the liquefied synthetic material include the same synthetic material. Using the same synthetic material guarantees a firm bonding connection between the add-on pieces and the fiber-reinforced support.

Because the synthetic material may need to penetrate the fiber mat multiple times to fill all cavities, the synthetic material may be introduced into the cavities of the tool components at a pressure of about 30,000 kPa to about 50,000 kPa, to ensure a complete filling of all cavities.

In some embodiments, the synthetic material includes a polymer, such as PP, ABS, PC/ABS, or PA. In some embodiments, the polymer may include added filler—and/or reinforcing materials, such as PP T20.

In some embodiments, the mat is a thermo- or duroplastic fiber system with natural fibers, glass fibers, mineral fibers, synthetic fibers, cellulose fibers, and/or carbon fibers, and has a thickness of about 8 to about 15 millimeters prior to injection.

The disclosure has been explained for use in an automobile. Nevertheless, the disclosure can also be implemented in other areas, such as in the transportation area, especially in air and sea travel, furniture making, etc. The disclosure is particularly suitable for the interior of motor vehicles because this requires, to a high degree, an appealing appearance over a long service life at a high production productivity. Furthermore, additional advantages and characteristics of the disclosure are shown in the following description of embodiments. The characteristics described there can be implemented on their own or in combination with one or a plurality of the characteristics mentioned above to the extent that the characteristics are not contradictory. The following description of the embodiments makes reference to the accompanying drawings.

DESCRIPTION OF THE EMBODIMENTS

Figure 1A:
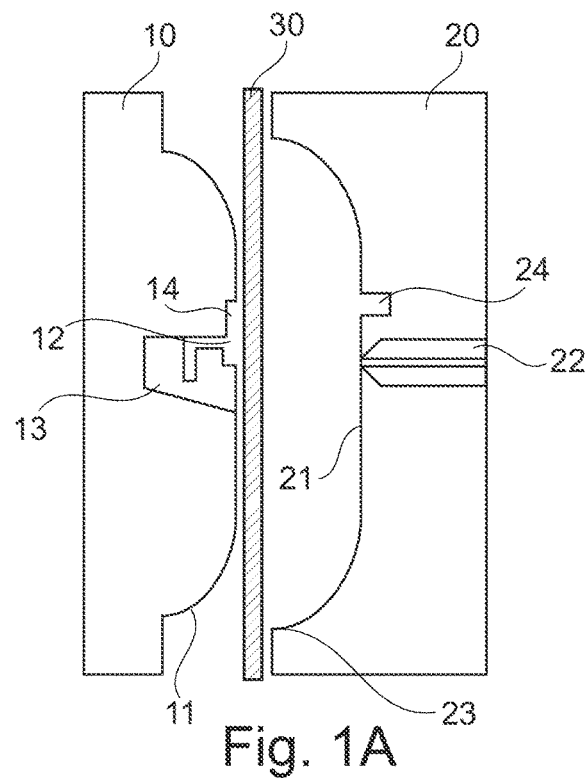
FIG. 1A is a schematic view of a device for producing a mold with two tool components in an opened state.

FIG. 1A shows an exemplary device (also referred to as a "tool") consistent with embodiments of the disclosure, including a movable first tool component 10 and a stationary second tool component 20. The two tool components 10, 20 are developed as molds with pressing surfaces 11 and 21. When a fiber mat 30 is inserted between the pressing surfaces 11 and 21 and the pressing surfaces 11 and 21 are pressed together, the fiber mat 30 can have the form of a desired support element. FIG. 1A shows an opened state, when the fiber mat 30 is being inserted.

The stationary tool component 20 has a hot nozzle 22 with a needle shutoff, which is suitable for injecting a hot synthetic material melt against the still unmolded or already molded mat 30 by means of pressure. If it is pressed against the still unmolded mat 30, the tool has at least one additional intermediate state in which the tool is closed, but a molding of the mat does not yet occur, or occurs only partially.

When the device is closed, the nozzle 22 is located opposite a cavity 12 away from the nozzle so that, when the needle of the shutoff of the nozzle 22 is opened, the hot, pressurized melt penetrates the molded or at least partially molded mat 30 and reaches the opposite cavity 12 away from the nozzle. In this way, an add-on piece is created on a side of the mat 30, which is also referred to as a rear side. The hollow space of the cavity 12 away from the nozzle corresponds to the form of the add-on piece. The cavity 12 away from the nozzle can be provided in an interchangeable or movable tool element 13 so that with a simple conversion of the tool, various add-on pieces and therefore various decorative element supports or decorative elements can be produced.

In the second tool component 20, a cavity 24 at the nozzle is provided. If additional synthetic material is injected after the cavity 12 away from the nozzle has been filled, the synthetic material will penetrate the mat 30 again and reach the cavity 24 at the nozzle.

Figure 1B:
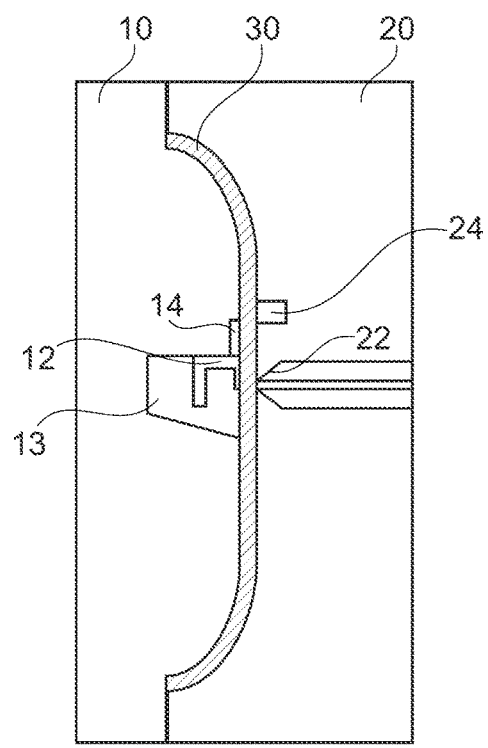
FIG. 1B shows the device in FIG. 1A in a closed state.

Consistent with embodiments of the disclosure, when producing a mold, the mat 30 is placed between the tool components 10 and 20, and, if applicable, fastened at one of the two tool components 10 and 20. The temperature of the mat 30 can be increased in advance or with a heating device that is integrated into one or both of the tool components 10, 20. The tool components 10, 20 move together and press the mat 30, as shown in FIG. 1B.

The molding strengthens the mat 30 and determines the three-dimensional contour of the support to be developed. Cooling the molded mat 30 leads to a dimensionally stable support. Furthermore, as the two tool components 10 and 20 close, a cutting edge 23 acts on the mat 30, creating a contour or a breakthrough on the mat 30.

During or after completion of the molding process, a synthetic material melt is introduced into the closed tool via the nozzle 22, which penetrates the fiber mat 30 and fills the cavity 12 away from the nozzle. To simplify the penetration of the synthetic material melt, the fiber mat 30 can be first perforated or provided with holes, or rendered permeable in another way. For example, the needle of the nozzle 22 can be driven to reach out of the nozzle 22 and into the mat 30 to shorten the penetration path or create a breakthrough through the mat 30.

If excessive melt is supplied, the melt will penetrate the mat 30 again and fill the cavity 24 at the nozzle. The mat 30 does not have to be separately attenuated between the two cavities 12 and 24 because this is done automatically by the pressurized melt. By means of the controllable needle-shutoff nozzle 22, the melt quantity and the pressure can be controlled. Furthermore, the needle system provides the surface with a clean finish to obtain a bump-free geometry, if applicable. After the cooling time, the movable tool component 10 opens. The final molding of the component is done by means of ejection or slanted ejection.

In some embodiments, penetration of the mat 30 during reflux is facilitated by overlapping the cavities 12 and 24 at least partially in cross-section (perpendicular to the inserted mat 30). This is shown in the figures in that the cavity 12 away from the nozzle has a section 14 that is provided so that it partially overlaps with the cavity 24 at the nozzle. In that case, the melt does not have to penetrate the mat 30 and along the extension of the mat 30 up to the cavity 24 at the nozzle, but rather first flows into the section 14 and then penetrates the mat 30 in the shortest way, i.e., in a direction perpendicular to the orientation of the mat 30. Accordingly, the pressure for injecting the melt can be reduced. The mat 30 is penetrated gently, i.e., there is little damage to a fiber structure of the mat 30.

As the injected synthetic matter penetrates the thermo- or duroplastic fiber mat system, a firm connection is created, which is based not only on a mechanical rear-clawing of the solidified add-on piece and the dimensionally stable support, but also on a material connection of the respective synthetic materials because both are still in a viscous, connectable state during the production process. After the product has cooled, an excellent integrity of the add-on pieces and the fiber-reinforced support is achieved.

In some embodiments, additional process steps, such as, for example, cutting, end-molding, laminating, and the like can be performed.

Figure 2A:
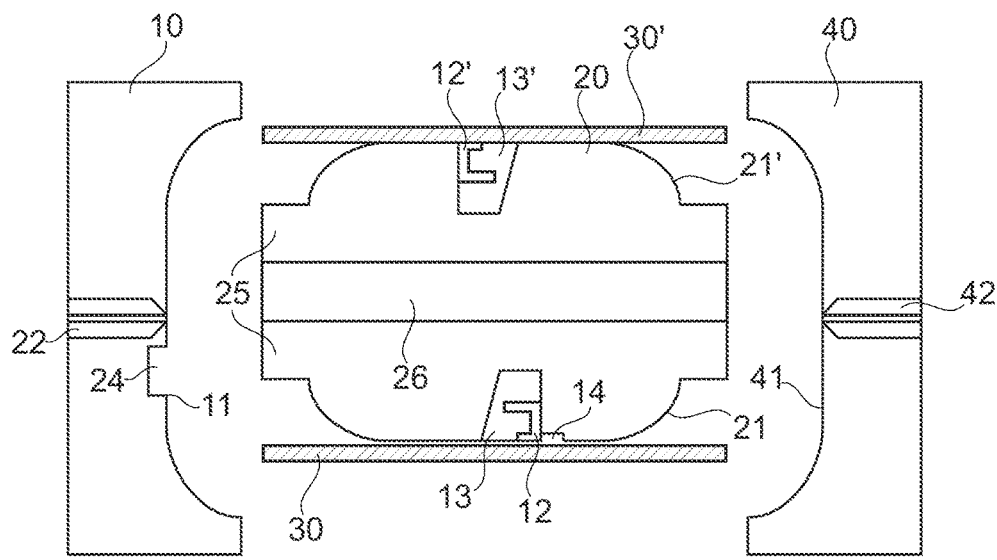
FIG. 2A shows a device for the production of a mold with three tool components in an opened insertion state.
Figure 2B:
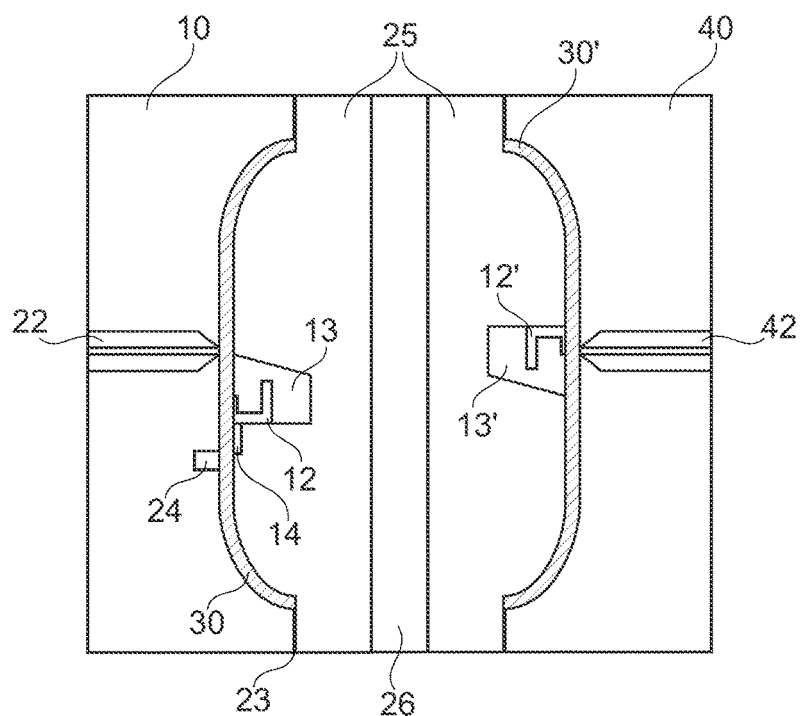
FIG. 2B shows the device in FIG. 2A in a closed state.

FIGS. 2A and 2B show another exemplary device consistent with embodiments of the disclosure. In the device shown in FIGS. 2A and 2B, the tool component 20 is designed as a turning unit 26, which has two tool sides 25 for pressing and injecting. The two tool sides 25 each have a pressing surface 21 and 21', which can be identical to or different from each other. The pressing surfaces 21 and 21' interact with the pressing surface 11 of the tool component 10 and a pressing surface 41 of a third tool component 40. The turning unit 26 is rotatable relative to the tool components 10 and 40.

With the device shown in FIGS. 2A and 2B, a one-step process and a two-step process can be performed.

The one-step process is similar to the production process described above in regard to the device shown in FIGS. 1A and 1B, with the device of FIGS. 2A and 2B allowing a simultaneous production of two molds. The tool component 10 has the cavity 24 at the nozzle. Alternately or in addition, the tool component 40 may have a cavity at the nozzle (not shown in the figures). Consistent with embodiments of the disclosure, that the turning unit 26 is able to rotate simplifies the insertion of the mats. After two mats 30 and 30' have been inserted when the device is in the state shown in FIG. 2A, the turning unit 26 rotates, for example, clockwise by 90°, such that the pressing surfaces 21 and 21' of the tool sides 25 are opposite the corresponding pressing surfaces 11 and 41 of the tool components 10 and 40. By moving together, an injection is performed on both sides, as shown in FIG. 2B, which creates the fiber-reinforced supports. At the same time, or after the pressing, if applicable after a brief waiting time, the synthetic material is injected through the nozzles 22 and 42 into the appropriate cavities 12, 24, and 12'. After the cooling time is over, the tool opens and the turning unit rotates again, for example, clockwise by 90° or counter-clockwise by 90°, and then the two produced molds can be removed.

Figure 3:
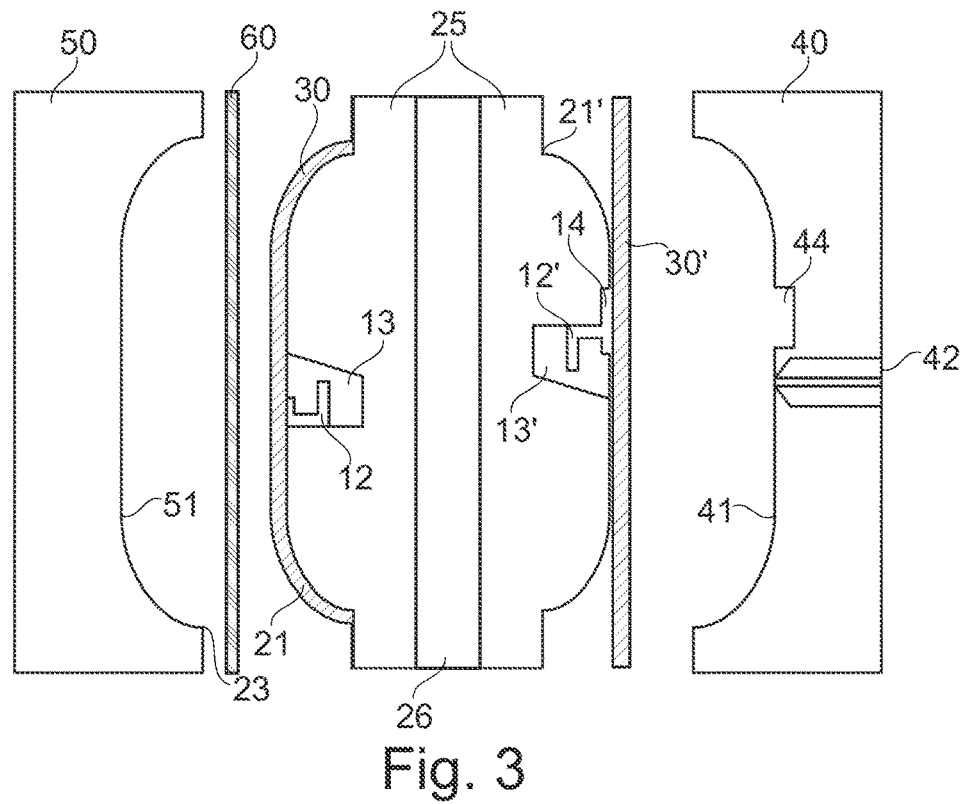
FIG. 3 shows a device for the production of a mold with three tool components in an opened state.

In the two-step process, a mat 30' is first inserted and/or chucked at the one side of the turning unit 26, similar to an insertion state as the one shown in FIG. 2A, whereas at the other side, a mat 30 that has already been molded and provided with add-on pieces rests at the pressing surface 21 of the turning unit 26. Then, the turning unit 26 is rotated according to FIG. 3 so that the newly inserted mat 30' interacts with the third tool component 40 when the tool is closed, whereas the second mat 30 interacts with a first tool component 50 when the tool is closed. The newly inserted mat 30' is molded and at least one add-on piece is injection-molded similar to the process shown in FIG. 1B, with the cavity 44 at the nozzle being provided in the tool component 40 here. The already molded mat 30 is laminated with a decorative layer 60, preferably a decorative foil. To that end, the pressing surface 51 of the first tool component 50 interacts with the turning unit 26 in a suitable fashion.

In this way, a mat runs through two molding stages and/or two integration stages. It is possible to break down the two process steps of injection and integration to the two sides of the device. In that case, the tool component 50 or 40 and one of the two sides 25 can be free of cavities and/or nozzles.

The remaining process steps of molding and integrating an add-on piece are similar to the above description with respect to FIGS. 1A and 1B.

Figure 4:
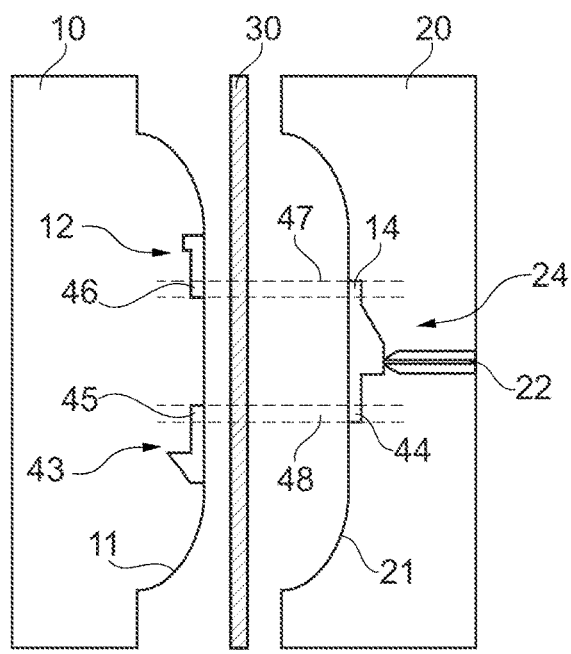
FIG. 4 shows an additional device for the production of a mold in an opened state.

FIG. 4 shows another exemplary device consistent with embodiments of the disclosure, where a movable first tool component 10 and a stationary second tool component 20 are arranged oppositely. Both tool components 10, 20 have a pressing surface 11, 21; the first tool component 10 and its pressing surface 11 can be driven into the pressing surface 21 of the second tool component in such a fashion that a fiber mat 30 inserted between the tool components 10, 20 can be pressed and molded between the pressing surfaces 11, 21. The second tool component 20 includes a cavity 24 at the nozzle. Furthermore, a nozzle 22 is arranged in the second tool component to introduce liquefied synthetic material. The nozzle 22 runs directly into the cavity 24 at the nozzle. The first tool component 10 includes two cavities 12, 43 away from the nozzle, which are spatially separated. The cavity 24 at the nozzle as well as the cavities 12, 43 away from the nozzle include sections 14, 44, 45, 46, which ensure an overlapping of the cavities 12, 43 away from the nozzle and the cavity 24 at the nozzle so that the cavity 24 at the nozzle forms a respective overlapping area 47, 48 with the two cavities 12, 43 away from the nozzle.

In a process (not shown) for developing the add-on pieces, a preheated fiber mat 30 is arranged between the two tool components 10, 20 and then the first tool component 10 is moved into the second tool component 20 in such a fashion that the fiber mat 30 is molded between the pressing surfaces 11, 21 of the tool components 10, 20. Immediately after the first tool component 10 has completed its movement into the second tool component 20, liquefied synthetic material is filled into the cavity 24 at the nozzle via the nozzle 22. Even after the cavity 24 at the nozzle has been filled with synthetic material, additional synthetic material is introduced into the cavity 24 at the nozzle via the nozzle 22 so that the pressure of the synthetic material on the fiber mat 30 increases, in particular in the overlapping areas 47, 48. As soon as sufficient pressure has been built up, the synthetic material penetrates the fiber mat 30 in the overlapping areas 47, 48 and flows into the cavities 12, 43 away from the nozzle to fill them. The subsequent hardening of the liquid synthetic material then forms the add-on pieces.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

The invention claimed is:

1. A method for producing a molded part, comprising:
   inserting a fiber-reinforced mat between a first pressing surface of a first tool component and a second pressing surface of a second tool component that are in an opened state, wherein:
      the mat extends in a first direction substantially parallel to the first and second pressing surfaces;
      the first tool component has a first cavity having an extending section that extends the first cavity in the first direction;
      the second tool component has a second cavity and a nozzle configured to supply a liquefied synthetic material; and
      the extending section is configured to allow the liquefied synthetic material to flow substantially parallel to the mat in the first direction and to extend the first cavity towards the second cavity, such that only the extending section overlaps a portion of the second cavity, in a cross-section perpendicular to the mat, in an overlapping area;
   closing the first and second tool components so that the mat is pressurized and molded to produce a fiber-reinforced support; and
   introducing the liquefied synthetic material through the nozzle into the mat, such that:
      the liquefied synthetic material penetrates the mat a first time to fill the first cavity, including the extending section; and
      the liquefied synthetic material penetrates the mat a second time, in the overlapping area, to fill the second cavity after the first cavity, including the extending section, is filled.

2. The method according to claim 1, wherein introducing the liquefied synthetic material is performed immediately after the first and second tool components has been closed.

3. The method according to claim 1, further comprising: preheating the mat to a temperature between about 100° C. and about 300° C.

4. The method according to claim 1, wherein:
the mat includes a thermoplastic matrix, and
introducing the liquefied synthetic material includes introducing the liquefied synthetic material while the thermoplastic matrix is plasticized.

5. The method according to claim 1, wherein introducing the liquefied synthetic material includes introducing the liquefied synthetic material at a pressure of about 30,000 kPa to about 50,000 kPA.

6. The method according to claim 1, wherein introducing the liquefied synthetic material includes introducing a liquefied polymer.

7. The method according to claim 6, wherein introducing the liquefied polymer includes introducing at least one of PP, ABS, PC/ABS, or PA.

8. The method according to claim 6, wherein introducing the liquefied polymer includes introducing a liquefied polymer having at least one of a filler or a reinforcing substance.

9. The method according to claim 8, wherein introducing a liquefied polymer having the reinforcing substance includes introducing a liquefied polymer having PP T20.

10. The method according to claim 1, wherein inserting the mat includes inserting a thermal or duroplastic fiber system with at least one of natural fibers, glass fibers, mineral fibers, synthetic fibers, cellulose fibers, or carbon fibers.

11. The method according to claim 1, wherein inserting the mat includes inserting a fiber-reinforced mat having a thickness of about 8 to about 15 mm.

12. The method according to claim 1, wherein closing the first and second tool components to produce the fiber-reinforced support includes producing a fiber-reinforced support having a thickness of about 1 to about 3 mm.

* * * * *